US012573058B2

(12) United States Patent
Li et al.

(10) Patent No.: US 12,573,058 B2
(45) Date of Patent: Mar. 10, 2026

(54) MOTION-AWARE NEURAL RADIANCE FIELD NETWORK TRAINING

(71) Applicant: Samsung Electronics Co., Ltd., Suwon-si (KR)

(72) Inventors: Yahang Li, Champaign, IL (US); Nguyen Thang Long Le, Garland, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/334,931

(22) Filed: Jun. 14, 2023

(65) Prior Publication Data

US 2024/0420341 A1      Dec. 19, 2024

(51) Int. Cl.
| | |
|---|---|
| *G06T 7/246* | (2017.01) |
| *G06T 7/11* | (2017.01) |
| *G06T 7/90* | (2017.01) |
| *G06T 17/00* | (2006.01) |
| *G06V 10/44* | (2022.01) |

(52) U.S. Cl.
CPC .............. *G06T 7/246* (2017.01); *G06T 7/11* (2017.01); *G06T 7/90* (2017.01); *G06T 17/00* (2013.01); *G06V 10/44* (2022.01); *G06T 2207/10024* (2013.01); *G06T 2207/20081* (2013.01)

(58) Field of Classification Search
CPC .................................. G06V 10/44; G06T 17/00
See application file for complete search history.

(56) References Cited

U.S. PATENT DOCUMENTS

| | | | |
|---|---|---|---|
| 9,531,962 | B2 | 12/2016 | Sezer et al. |
| 10,805,649 | B2 | 10/2020 | Pekkucuksen et al. |
| 11,151,731 | B2 | 10/2021 | Zhen et al. |
| 11,570,418 | B2 | 1/2023 | Hirt |

(Continued)

FOREIGN PATENT DOCUMENTS

| | | |
|---|---|---|
| CN | 114863035 B | 9/2022 |
| CN | 115359195 A | 11/2022 |

(Continued)

OTHER PUBLICATIONS

Huang et al, "DeepMVS: Learning Multi-view Stereopsis", CV, pp. 1-10, 2018 (Year: 2018).*

(Continued)

*Primary Examiner* — Edward Park

(57) ABSTRACT

A method includes obtaining multiple training image frames of a scene, where the training image frames are captured at multiple viewpoints and multiple viewing angles relative to the scene. The method also includes generating multiple initial motion maps using the training image frames and identifying three-dimensional (3D) feature points associated with the scene using the training image frames. The method further includes generating tuned motion masks using the initial motion maps and projections of the 3D feature points onto the initial motion maps. In addition, the method includes training a machine learning model using the training image frames and the tuned motion masks, where the machine learning model is trained to generate 3D information about the scene from viewpoints and viewing angles not captured in the training image frames.

20 Claims, 11 Drawing Sheets

(56) References Cited

U.S. PATENT DOCUMENTS

| | | | | |
|---|---|---|---|---|
| 2022/0262024 A1* | 8/2022 | Sun | .......................... | G06T 17/00 |
| 2024/0331277 A1* | 10/2024 | Liberman Paz | ....... | A61C 13/34 |

FOREIGN PATENT DOCUMENTS

| | | |
|---|---|---|
| CN | 115482332 A | 12/2022 |
| CN | 115690382 B | 3/2023 |
| CN | 115761565 A | 3/2023 |

OTHER PUBLICATIONS

Yan et al, "NeRF-DS: Neural Radiance Fields for Dynamic Specular Objects", CV, Mar. 2023, pp. 1-16 (Year: 2023).*

Tretschk, et al, "Non-Rigid Neural Radiance Fields: Reconstruction and Novel View Synthesis of a Dynamic Scene From Monocular Video", CV, Aug. 2021, pp. 1-20 (Year: 2021).*

Mildenhall et al., "NeRF: Representing Scenes as Neural Radiance Fields for View Synthesis", arXiv:2003.08934v2 [cs.CV], Aug. 2020, 25 pages.

Tretschk et al., "Non-Rigid Neural Radiance Fields: Reconstruction and Novel View Synthesis of a Dynamic Scene From Monocular Video", arXiv:2012.12247v4 [cs.CV], Aug. 2021, 20 pages.

Park et al., "Nerfies: Deformable Neural Radiance Fields", arXiv:2011.12948v5 [cs.CV], Sep. 2021, 18 pages.

"Tutorial—COLMAP 3.8-dev documentation", web.archive.org, Feb. 2023, 22 pages.

Fisher, "3×4 Projection Matrix", https://homepages.inf.ed.ac.uk/rbf/CVonline/LOCAL_COPIES/EPSRC_SSAZ/node3.html, Apr. 1997, 3 pages.

Chen et al., "Animatable Neural Radiance Fields from Monocular RGB Videos", arXiv:2106.13629v1 [cs.CV], Jun. 2021, 11 pages.

Tretschk et al., "Non-Rigid Neural Radiance Fields: Reconstruction and Novel View Synthesis of a Deforming Scene From Monocular Video", arXiv:2012.12247v2 [cs.CV], Dec. 2020, 9 pages.

"Structure from Motion", Contributors to Wikimedia projects, en.wikipedia.org, Feb. 2023, 15 pages.

Schönberger et al., "Structure-from-Motion Revisited", IEEE Conference on Computer Vision and Pattern Recognition (CVPR), 2016, 10 pages.

* cited by examiner 704    706

900

START

902 — Identify viewpoint and viewing angle associated with scene

904 — Provide viewpoint and viewing angle to trained machine learning model

906 — Generate 3D information about scene using trained machine learning model

908 — Render image of scene using 3D information

910 — Store/output/use rendered image

END

MOTION-AWARE NEURAL RADIANCE FIELD NETWORK TRAINING

TECHNICAL FIELD

This disclosure relates generally to imaging systems. More specifically, this disclosure relates to motion-aware neural radiance field network training.

BACKGROUND

A neural radiance field (NeRF) network is an example of a multi-layer perceptron (MLP) network, which is a fully-connected multi-layer neural network. A NeRF network can be used to generate novel views of a complex three-dimensional (3D) scene based on a partial set of two-dimensional (2D) images. In other words, the NeRF network can be trained using 2D images of a 3D scene so that additional images of the 3D scene can be generated from specific viewpoints and specific viewing directions, including viewpoints and viewing directions not captured in the 2D images. For example, a NeRF network can be trained to generate color and density information within a scene, and classical volume rendering equations can be used to convert the color and density information into an image of the scene from a specific viewpoint and a specific viewing direction.

SUMMARY

This disclosure relates to motion-aware neural radiance field network training.

In a first embodiment, a method includes obtaining multiple training image frames of a scene, where the training image frames are captured at multiple viewpoints and multiple viewing angles relative to the scene. The method also includes generating multiple initial motion maps using the training image frames and identifying three-dimensional (3D) feature points associated with the scene using the training image frames. The method further includes generating tuned motion masks using the initial motion maps and projections of the 3D feature points onto the initial motion maps. In addition, the method includes training a machine learning model using the training image frames and the tuned motion masks, where the machine learning model is trained to generate 3D information about the scene from viewpoints and viewing angles not captured in the training image frames. In another embodiment, a non-transitory machine readable medium includes instructions that when executed cause at least one processor to perform the method of the first embodiment.

In a second embodiment, an electronic device includes at least one processing device configured to obtain multiple training image frames of a scene, where the training image frames are captured at multiple viewpoints and multiple viewing angles relative to the scene. The at least one processing device is also configured to generate multiple initial motion maps using the training image frames and identify 3D feature points associated with the scene using the training image frames. The at least one processing device is further configured to generate tuned motion masks using the initial motion maps and projections of the 3D feature points onto the initial motion maps. In addition, the at least one processing device is configured to train a machine learning model using the training image frames and the tuned motion masks, where the machine learning model is trained to generate 3D information about the scene from viewpoints and viewing angles not captured in the training image frames.

In a third embodiment, a method includes identifying a specified viewpoint and a specified viewing angle associated with a scene. The method also includes providing the specified viewpoint and the specified viewing angle to a machine learning model. The method further includes generating 3D information about the scene using the machine learning model. In addition, the method includes rendering an image of the scene from the specified viewpoint and at the specified viewing angle using the 3D information about the scene. The machine learning model is trained to compensate for motion within the scene that is captured in training image frames used to train the machine learning model. In another embodiment, an apparatus includes at least one processing device configured to perform the method of the third embodiment. In still another embodiment, a non-transitory machine readable medium includes instructions that when executed cause at least one processor to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B"

may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

US 12,573,058 B2

5

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
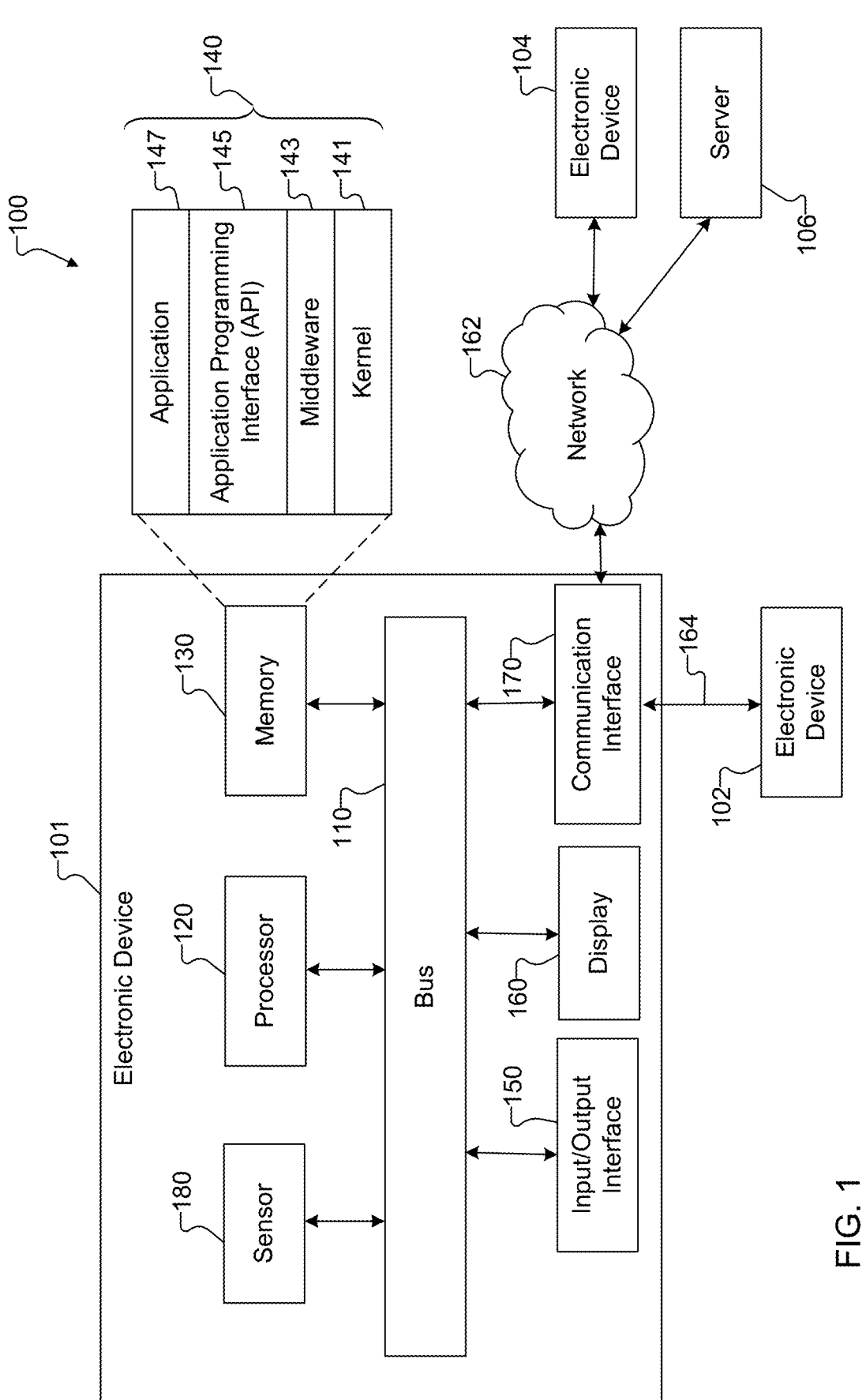
FIG. 1 illustrates an example network configuration including an electronic device according to this disclosure.

FIGS. 1 through 9, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, a neural radiance field (NeRF) network is an example of a multi-layer perceptron (MLP) network, which is a fully-connected multi-layer neural network. A NeRF network can be used to generate novel views of a complex three-dimensional (3D) scene based on a partial set of two-dimensional (2D) images. In other words, the NeRF network can be trained using 2D images of a 3D scene so that additional images of the 3D scene can be generated from specific viewpoints and specific viewing directions, including viewpoints and viewing directions not captured in the 2D images. For example, a NeRF network can be trained to generate color and density information within a scene, and classical volume rendering equations can be used to convert the color and density information into an image of the scene from a specific viewpoint and a specific viewing direction.

Training data that is used to train a NeRF network typically includes multiple training images captured of a scene, where the training images capture the scene from different viewpoints and directions. However, the training images need to capture a static scene, meaning a scene with no motion, which can be difficult or impossible to achieve in a number of situations. To try and overcome this obstacle, non-rigid neural radiance field (NR-NeRF) networks have been developed. A NR-NeRF network attempts to disentangle a dynamic scene into a canonical neural radiance field (which captures a scene's static geometry and appearance) and a scene deformation field (which defines how the canonical neural radiance field is deformed to create each individual training image). Scene deformation can be implemented using a ray-bending network, which allows straight rays to be deformed non-rigidly. For example, in an NR-NeRF network, the ray-bending network can be trained to transform various points' positions on rays into their canonical configurations using rigidity and deformation field values.

Unfortunately, both standard NeRF networks and NR-NeRF networks are generally unable to handle motion within scenes very well. As a result, motion in scenes can introduce severe artifacts in the images produced using the NeRF and NR-NeRF networks. As examples, halo artifacts are often created around transition points between light and dark areas of scenes, and ghosting artifacts are often created due to object motion that occurs while an image capturing process occurs.

This disclosure provides various techniques related to motion-aware neural radiance field network training. As described in more detail below, the disclosed techniques use motion estimation, such as motion estimation generated during multi-frame processing (MFP), to augment the training of a machine learning model (such as an NR-NeRF network) so that one or more moving objects in a scene can be rendered properly. For example, multiple training image frames of a scene can be obtained, where the training image frames can be captured at multiple viewpoints and multiple viewing angles relative to the scene. Initial motion maps associated with the training image frames can be generated, and sparse 3D feature points associated with the scene (such as stationary points within the scene) can be estimated using the training image frames. Tuned motion masks can be generated using the initial motion maps and projections of the 3D feature points onto the initial motion maps. In some cases, this may allow a motion map to be generated for each non-reference image frame contained in a collection of training image frames during multi-frame processing and fine-tuned using the projected sparse 3D feature points to produce a tuned motion mask. The tuned motion masks can be used to guide training of a machine learning model, such as an NR-NeRF network. For instance, the tuned motion masks can help to guide the training of the machine learning model by differentiating between motion areas and non-motion areas within the training image frames. In this way, the disclosed techniques enable "motion-aware" training of NR-NeRF networks or other machine learning models.

A NR-NeRF network or other machine learning model trained in this manner may be used or deployed to one or more consumer electronic devices or other devices for use. For example, a specified viewpoint and a specified viewing angle associated with the scene can be identified and provided as inputs to the trained machine learning model. The machine learning model can be used to generate 3D information about the scene, such as color and density information. An image of the scene from the specified viewpoint and at the specified viewing angle can be rendered using the 3D information about the scene. Here, the machine learning model has been trained to compensate for motion within the scene, where that motion is captured in training image frames used to train the machine learning model. In this way, the disclosed techniques can be used to facilitate the generation of views of 3D scenes, even if there is motion within the training image frames used to train the machine learning model.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs motion-aware training of a NR-NeRF network or other machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to motion-aware training and/or use of a NR-NeRF network or other machine learning model.

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to motion-aware training and/or use of a NR-NeRF network or other machine learning model. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to motion-aware training and/or use of a NR-NeRF network or other machine learning model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
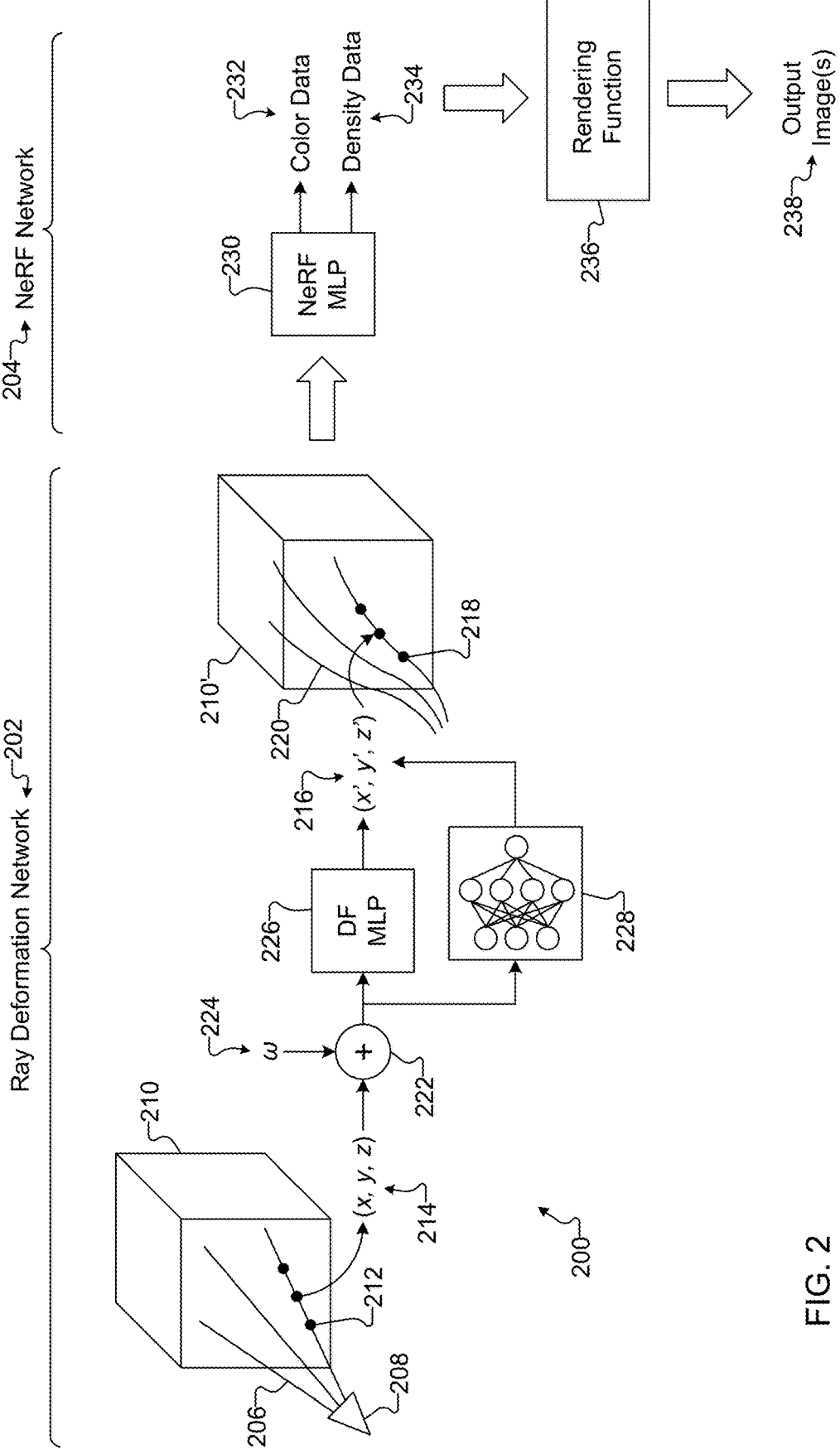
FIG. 2 illustrates an example non-rigid neural radiance field (NR-NeRF) network according to this disclosure.

FIG. 2 illustrates an example NR-NeRF network 200 according to this disclosure. For ease of explanation, the NR-NeRF network 200 is described as being trained by the server 106 and used by the electronic device 101 in the network configuration 100 of FIG. 1. However, the NR-NeRF network 200 may be trained and used by the same component (such as the server 106) or trained and used by any other suitable device(s) and in any other suitable system(s).

As shown in FIG. 2, the NR-NeRF network 200 includes a ray deformation network 202 and a NeRF network 204. The ray deformation network 202 generally operates to bend rays 206 associated with a viewer perspective or other perspective 208 of an observation frame 210. The observation frame 210 can represent or include a 3D scene that is captured using 2D images. The rays 206 represent rays of light in the observation frame 210 that may be viewed at the perspective 208. The ray deformation network 202 accomplishes this by identifying points 212 along the rays 206, where each of the points 212 is associated with corresponding coordinates 214 within the observation frame 210. The ray deformation network 202 operates to convert the coordinates 214 of the points 212 into converted coordinates 216, which are associated with points 218 positioned along bent rays 220 within a canonical frame 210'. In other words, the ray deformation network 202 is trained to transform x=(x, y, z) (which are the coordinates 214 of each point 212 on a ray 206) into its canonical configuration x'=(x', y', z')=(x, y, z)+m×(δx, δy, δz). Here, m represents a learned rigidity score, and (δx, δy, δz) represents a deformation field. As described above, the NR-NeRF network 200 attempts to disentangle a dynamic scene into a canonical neural radiance field (which captures a scene's static geometry and appearance) and a scene deformation field (which defines how the canonical neural radiance field is deformed to create each individual training image), where scene deformation can be implemented using a ray-bending network. This transformation may be expressed as $\psi(x) \to \{\delta x, m\}$. As described below, after the transformation, color and density information can be estimated using the NeRF network 204, and this estimation can be expressed as $\mathcal{N}(x+\psi(x)) \to (c, \sigma)$. Here, $\psi(x)$ represents a network-induced ray-deformation operation, and $\mathcal{N}(x)$ represents the operation of the NeRF network 204. Also, c represents the color information generated by the NeRF network 204, and σ represents the density information generated by the NeRF network 204.

In this example, the ray deformation network 202 receives, identifies, or otherwise obtains the coordinates 214 for the points 212 along the rays 206. Each set of coordinates 214 is provided to a combiner 222, which combines the coordinates 214 with a latent deformation code 224 (denoted ω). The latent deformation code 224 is used to define a deformation field. The resulting outputs of the combiner 222 are provided to a deformation field (DF) multi-layer perceptron (MLP) network 226, which warps 3D points of the observation frame 210 into 3D points of the canonical frame 210' based on the latent deformation code 224. The canonical frame 210' represents a frame of reference of a canonical model. The resulting outputs of the combiner 222 are also provided to a rigidity network 228, which segments the scene within the observation frame 210 into rigid and non-rigid portions, such as a rigid background and a non-rigid foreground. Essentially, a scene captured in multiple image frames can be represented by the canonical model, and deformations (motion) within the scene can be expressed as deformations. The deformations can be defined using per-time-step warpings of the canonical model, and these deformations are provided by the ray deformation network 202. The rigidity network 228 helps to force the identification of the warpings to be limited to non-rigid portions of the scene while assuming that the rigid portions of the scene do not deform. This permits reconstruction of the rigid portions of the scene without deformation. The combiner 222 and the deformation field MLP network 226 here collectively form at least part of a non-rigid ray-bending network.

The NeRF network 204 in this example is implemented using a NeRF MLP network 230. The NeRF MLP network 230 generally operates to process information, including information generated by the ray deformation network 202, in order to generate 3D information associated with the scene. In this example, the 3D information includes color data 232 and density data 234. The color data 232 and the density data 234 can collectively define the color and density of each point within a 3D space represented by the canonical model. The color data 232 and the density data 234 may be used in any suitable manner. In this example, the color data 232 and the density data 234 are provided to a rendering function 236, which can use classical volume rendering equations or other techniques to render one or more output images 238. For instance, based on a specified viewpoint and a specified viewing angle (which can collectively define an image plane), the rendering function 236 can render an image 238 of the scene from that viewpoint and at that viewing angle using the color data 232 and the density data 234.

As discussed below, the NR-NeRF network 200 is trained using training image frames that capture motion within the scene. Among other things, the training image frames are used to generate motion masks, which can segment the training image frames into regions with motion and regions without motion or without significant motion. This helps to guide the training of the NR-NeRF network 200 by allowing differentiation between motion areas and non-motion areas within the training image frames. For example, within non-motion areas, the NR-NeRF network 200 can have less or no freedom to perform ray-bending. Within motion areas, the NR-NeRF network 200 can have more freedom to perform ray-bending. This helps to train the NR-NeRF network 200 more effectively, which allows the NR-NeRF network 200 to generate the color and density data 232 and 234 more effectively and render moving objects more accurately.

Although FIG. 2 illustrates one example of a NR-NeRF network 200, various changes may be made to FIG. 2. For example, other embodiments of NR-NeRF networks or other machine learning models may be used here. The specific implementation of the NR-NeRF network 200 as shown in FIG. 2 is for illustration and explanation only and can vary depending on the implementation.

Figure 3:
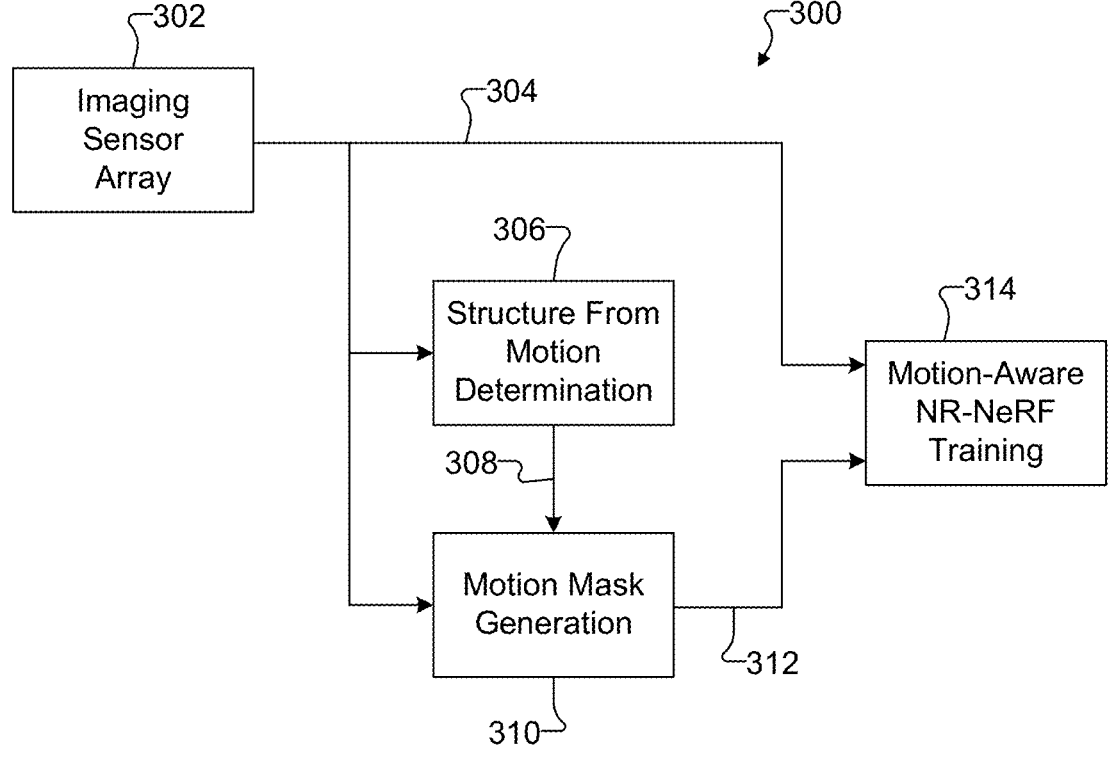
FIG. 3 illustrates an example architecture supporting motion-aware NR-NeRF network training according to this disclosure.

FIG. 3 illustrates an example architecture 300 supporting motion-aware NR-NeRF network training according to this disclosure. For ease of explanation, the architecture 300 is described as being used by the server 106 in the network configuration 100 of FIG. 1 to train the NR-NeRF network 200 of FIG. 2. However, the architecture 300 could be used by any other suitable device(s) and in any other suitable system(s), and the architecture 300 may be used to train any other suitable machine learning model(s).

As shown in FIG. 3, the architecture 300 includes or is used in conjunction with an imaging sensor array 302, which represents one or more cameras or other imaging sensors used to capture training image frames 304 of a scene. The imaging sensor array 302 includes any suitable number of cameras or other imaging sensors. In some cases, the imaging sensor array 302 may include multiple cameras or other imaging sensors that are used to capture training image frames 304 of a scene at or near the same time from different locations. In other cases, the imaging sensor array 302 may include one or more cameras or other imaging sensors that are used to capture training image frames 304 of a scene at different times from different locations, such as when the one or more imaging sensors are located on a portable device. In general, the imaging sensor array 302 may include one or more cameras or other imaging sensors configured to capture training image frames 304 of a scene. Each training image frame 304 can have any suitable resolution and format, such as raw/Bayer image frames, RGB image frames, or other image frames. The collection of training image frames 304 associated with the scene can capture some type of movement within the scene, such as one or more natural or manmade objects that are moving.

The training image frames 304 are provided to a structure from motion determination function 306. The structure from motion determination function 306 generally operates to estimate sparse 3D feature points within the scene using the 2D training image frames 304 associated with the scene. The phrase "structure from motion" here refers to the fact that the sparse 3D feature points within the scene can be estimated using training image frames 304 that are captured at different locations. By capturing the training image frames 304 at different locations, motion parallax can be used to derive depth information of the scene. Motion parallax refers to the fact that objects move differently (such as by different amounts) when viewed from different locations depending on their depths from those locations. The structure from motion determination function 306 processes the training image frames 304 associated with the scene in order to generate outputs 308, which can include an identification of sparse 3D feature points that represent stationary points within the scene and an identification of the poses of the imaging sensors used to capture the training image frames 304 associated with the scene. Note that this can be performed for any suitable number of training image frames 304 associated with the scene.

The training image frames 304 and the outputs 308 are provided to a motion mask generation function 310. The motion mask generation function 310 generally operates to produce motion masks 312, each of which identifies areas of motion within one or more of the training image frames 304. For example, the motion mask generation function 310 may implement a multi-frame processing (MFP) operation, such as one or more of the processes described in U.S. Pat. No. 10,805,649 (which is hereby incorporated by reference in its entirety). This patent describes processes for blending image frames, and those processes can involve the generation of motion maps. The motion maps generated in accordance with this patent can be modified as discussed below to generate the motion masks 312. For instance, at least some of the motion maps initially generated for the training image frames 304 can be fine-tuned by projecting the sparse 3D feature points from the outputs 308 onto the motion maps. Note, however, that the motion maps may be generated in any other suitable manner and may or may not be generated as part of a multi-frame processing operation.

A motion-aware NR-NeRF training function 314 uses the training image frames 304 and the motion masks 312 to train a machine learning model, such as the NR-NeRF network 200. For example, the motion-aware NR-NeRF training function 314 may use the motion masks 312 to guide the training of the NR-NeRF network 200 or other machine learning model by differentiating motion and non-motion areas within the training image frames 304. As a particular example, the NR-NeRF network 200 during training can have less or no freedom to perform ray-bending within non-motion areas and more freedom to perform ray-bending within motion areas. The motion-aware NR-NeRF training function 314 can train the NR-NeRF network 200 or other machine learning model using the training image frames 304 and the motion masks 312, ideally until a loss associated with the machine learning model falls below a threshold loss value. The loss identifies differences or errors between actual and desired outputs from the machine learning model. When the loss falls below the threshold loss value, that is indicative that the NR-NeRF network 200 or other machine learning model has been trained to properly generate 3D information (such as the color data 232 and the density data 234), at least to within a desired degree of accuracy as defined by the threshold loss value.

In some embodiments, the motion-aware NR-NeRF training function 314 operates as follows. For notational simplicity, assume that the ray deformation network 202 is denoted as $\psi(x_r)$, which describes how much a ray 206 should bend in order to generate a corresponding ray 220. Here, $x_r \in X$ represents all points 212 on ray r. Also, let $\mathcal{N}(\cdot)$ represent the NeRF network 204, where inputs to the NeRF network 204 include the coordinates 216 associated with the bent rays 220 and outputs of the NeRF network 204 include the color and density data 232, 234. Thus, the outputs of the NeRF network 204 can be expressed as $\{c_r, \sigma_r\} = \mathcal{N}(x_r + \psi(x_r))$, where $c_r$ represents the color data 232 (such as RGB data) and $\sigma_r$ represents the density data 234. The final color $\hat{C}_i \in \hat{C}$ for each pixel i in a rendered image of the scene (with R representing a volume rendering weighting operation performed by the rendering function 236) can be express as $\hat{C}_i = \Sigma_r R(c_r, \sigma_r)$.

For a specific sample k on a ray r, R can be defined as $R(c_k, \sigma_k) = T_k(1 - \exp(-\sigma_k \delta_k))c_k$, where $T_k = \exp(-\Sigma_{j=1}^{k-1}\sigma_j\delta_j)$ and $\delta_k$ represents the distance between two samples. Since the motion masks 312 can be used to differentiate between areas of the training image frames 304 with and without motion, the NR-NeRF network 200 can be trained to correctly generate 3D information for both motion and non-motion areas. In some cases, this can involve the use of a loss function that includes different terms associated with the motion and non-motion areas. For example, it is possible to classify each ray 206 as a motion ray or a static ray depending on whether that ray 206 passes through a motion region or a non-motion region of a training image frame 304 as defined by the associated motion mask 312. All of the points 212 associated with motion rays 206 can be referred to collectively as motion points $x_{motion}$, and all of the points

212 associated with static rays 206 can be referred to collectively as static points $x_{static}$ (where $x_{motion} \cup x_{static} = X$).

Given this, one possible loss function may be defined as follows.

$$L_{all} = \tag{1}$$
$$L_{data}(C, \hat{C}) + \mu L_{divergence}^{\psi}(X) + \lambda_{motion}L_{offset}^{\psi}(x_{motion}) + \lambda_{static}L_{offset}^{\psi}(x_{static})$$

Here, the term $L_{all}$ represents an overall loss value calculated for the machine learning model being trained and which can be compared to the threshold loss value. The term $L_{data}(C, \hat{C})$ represents a data loss calculated for the machine learning model being trained. The term $L_{divergence}^{\psi}$ represents a divergence loss calculated for the machine learning model being trained, and the value y represents a weight applied to the divergence loss. The terms $L_{offset}^{\psi}(x_{motion})$ and $L_{offset}^{\psi}$ $(x_{static})$ represent offset losses respectively associated with motion and static rays, and the values $\lambda_{motion}$ and $\lambda_{static}$ represent weights respectively associated with the motion and static rays. By making $\lambda_{motion} \ll \lambda_{static}$, the motion masks 312 can be used to artificially guide rays 206 to have more flexibility to bend in motion areas and less or no flexibility to bend in non-motion areas.

In some cases, the data loss $L_{data}(C, \hat{C})$ may be defined as follows.

$$L_{data}(C, \hat{C}) = \|C - \hat{C}\|_2^2 \tag{2}$$

Here, $\hat{C}$ represents the rendered color as generated by the rendering function 236 using the color data 232 generated by the NR-NeRF network 200, and C represents a ground truth color (meaning the expected color to be generated. Also, in some cases, the divergence loss may be defined as follows.

$$L_{divergence}\sum_r \sigma_r \odot |div(\psi(x_r))|^2 \tag{3}$$

Here, the divergence div may be defined as $$div(\psi(x)) = Tr\left(\frac{d\psi(x)}{dx}\right),$$

where $Tr(\cdot)$ represents the trace operator.

In addition, in some cases, each of the offset losses $L_{offset}^{\psi}(x_{motion})$ and $L_{offset}^{\psi}(x_{static})$ may be defined as follows. In the description above, the ray deformation network 202 was denoted as $\psi(x_r)$, and the output of the NeRF network 204 was expressed as $\{c_r, \sigma_r\} = \mathcal{N}(x_r + \psi(x_r))$. Now, as part of a more detailed loss explanation, the exact expression for $\psi(x_r)$ may be defined as $\psi(x_r) = m_r \odot \delta x_r$, where $m_r$ and $\delta x_r$ respectively represent a rigidity score (generated by the rigidity network 228) and a bending amount (generated by the deformation field MLP network 226) for ray samples. Also, $\odot$ represents an element-wise multiplication (Hadamard product). Given this, the output generated by the NeRF network 204 can be defined as $\{c_r, \sigma_r\} = \mathcal{N}(x_r + m_r \odot \delta x_r)$. Based on that, each of the offset losses $L_{offset}^{\psi}(x_{motion})$ and $L_{offset}^{\psi}(x_{static})$ may be defined as follows.

$$L_{offset} = \sum_r \alpha_r \odot \left( \|\delta x_r\|_2^{2-m_r} \right) + \eta m_r \qquad (4)$$

The same equation may be used separately to determine the motion and static offset losses $L_{offset}^{\psi}(x_{motion})$ and $L_{offset}^{\psi}$ ($x_{static}$). Here, $\alpha r$ is defined for a specific sample k on a ray r as $\alpha_k = T_k \sigma_k$, where $T_k = \exp(-\Sigma_{j=1}^{k-1} \sigma_j \delta_j)$. Also, $\delta_k$ represents the distance between adjacent samples, and $\eta$ represents a regularization parameter. Note that the exponent component in Equation (4) provides two desirable properties. For non-rigid regions (meaning $m_r$ is closer to 1), the offset loss becomes an $\ell$ loss. As a result, the gradient is independent of the magnitude of the offset, so small and large offsets motions are treated equally (unlike with an $\ell_2$ loss). Also, relative to an $\ell_2$ loss, this approach encourages sparsity in the offsets field. For rigid regions (meaning $m_r$ is closer to 0), the offset loss becomes an $\ell_2$ loss, which tapers off in its gradient magnitude as the offset magnitude approaches zero and prevents noisy gradients that an $\ell_1$ loss has for tiny offsets of rigid regions.

Once the motion-aware NR-NeRF training function 314 has been used to train the NR-NeRF network 200 or other machine learning model, the trained machine learning model may be placed into use, deployed to one or more other devices for use, or used in any other suitable manner. For example, the trained machine learning model may be used during inferencing operations to generate color data 232 and density data 234 that is provided to the rendering function 236, which can generate images 238 of the scene from specified viewpoints and viewing angles.

Although FIG. 3 illustrates one example of an architecture 300 supporting motion-aware NR-NeRF network training, various changes may be made to FIG. 3. For example, various components or functions shown in FIG. 3 may be combined, further subdivided, rearranged, replicated, or omitted and additional components can be added according to particular needs.

Figure 4:
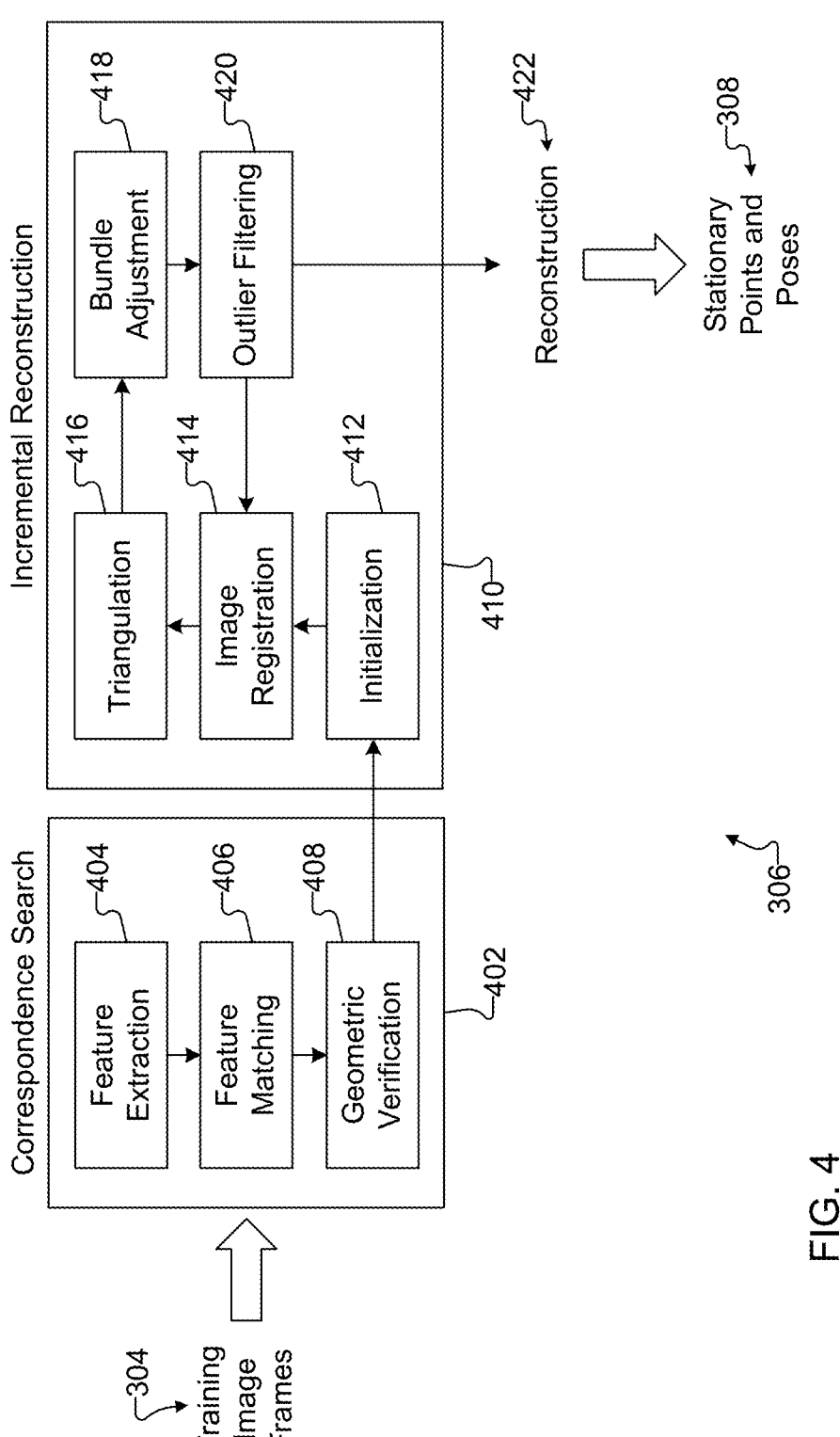
FIG. 4 illustrates an example structure from motion determination function in the architecture of FIG. 3 according to this disclosure.

FIG. 4 illustrates an example structure from motion determination function 306 in the architecture 300 of FIG. 3 according to this disclosure. As shown in FIG. 4, the training image frames 304 are processed using a correspondence search function 402. The correspondence search function 402 generally operates to identify overlap between the training image frames 304 and to identify projections of common points within the overlapping portions of the training image frames 304. In this example, the correspondence search function 402 includes a feature extraction function 404, a feature matching function 406, and a geometric verification function 408.

The feature extraction function 404 operates to identify features within the training image frames 304, such as features associated with people, vehicles, buildings, natural landmarks, or other contents of the training image frames 304. The feature matching function 406 operates to match the identified features in different training image frames 304 so that common features captured in multiple training image frames 304 are identified as being the same features. For example, the feature matching function 406 may determine that one or more identified features associated with the same object in different training image frames 304 represent the same features. The geometric verification function 408 attempts to verify whether the matching features are correct, such as by determining whether a valid mapping or transformation from one training image frame 304 to another training image frame 304 can be identified. The outputs of the correspondence search function 402 may take the form of a scene graph in which the training image frames 304 are nodes of the scene graph and verified pairs of training image frames 304 are edges of the scene graph.

The scene graph or other outputs of the correspondence search function 402 are provided to an incremental reconstruction function 410, which generally operates to identify imaging sensor poses for the verified training image frames 304 and scene structure based on the verified training image frames 304. In this example, the incremental reconstruction function 410 includes an initialization function 412, an image registration function 414, a triangulation function 416, a bundle adjustment function 418, and an outlier filtering function 420.

The initialization function 412 operates to create an initial model of the scene based on two or more of the training image frames 304. The image registration function 414 operates to register additional training image frames 304 (which were not used to create the initial model) with the initial model of the scene. Each additional training image frame 304 can include at least some of the scene points that are already within the model of the scene, and the triangulation function 416 uses the registered training image frames 304 to identify additional scene points within the model of the scene. Since the image registration function 414 and the triangulation function 416 are separate processes, uncertainties may exist with the imaging sensor poses and the scene points, and the bundle adjustment function 418 can apply nonlinear refinement to the imaging sensor poses and the scene points in order to refine the model of the scene. The outlier filtering function 420 reduces weights on or removes outliers in the model of the scene.

The final model of the scene generated by the incremental reconstruction function 410 can represent a reconstruction 422 of that scene, where the reconstruction 422 of the scene represents a 3D representation of the scene. Thus, the reconstruction 422 is a 3D representation of the scene and is generated based on 2D image frames of the scene. The reconstruction 422 may include the outputs 308 described above, such as stationary points within the scene and poses of the imaging sensors used to capture the training image frames 304.

The model of the scene generated here can have any suitable form. In some embodiments, imaging sensor poses that are defined by the model of the scene may include an N×3×5 matrix, where N represents the number of training image frames 304. Each training image frame 304 can be associated with two depth values that identify the closest and farthest scene content from a specific point of view associated with the corresponding pose. Also, each 3×5 matrix may include a 3×4 camera-to-world affine transform that is concatenated with a 3×1 column. The 3×1 column may include an image height, an image width, and a focal length associated with the corresponding training image frame 304.

Although FIG. 4 illustrates one example of a structure from motion determination function 306 in the architecture 300 of FIG. 3, various changes may be made to FIG. 4. For example, various components or functions shown in FIG. 4 may be combined, further subdivided, rearranged, replicated, or omitted and additional components can be added according to particular needs.

Figure 5:
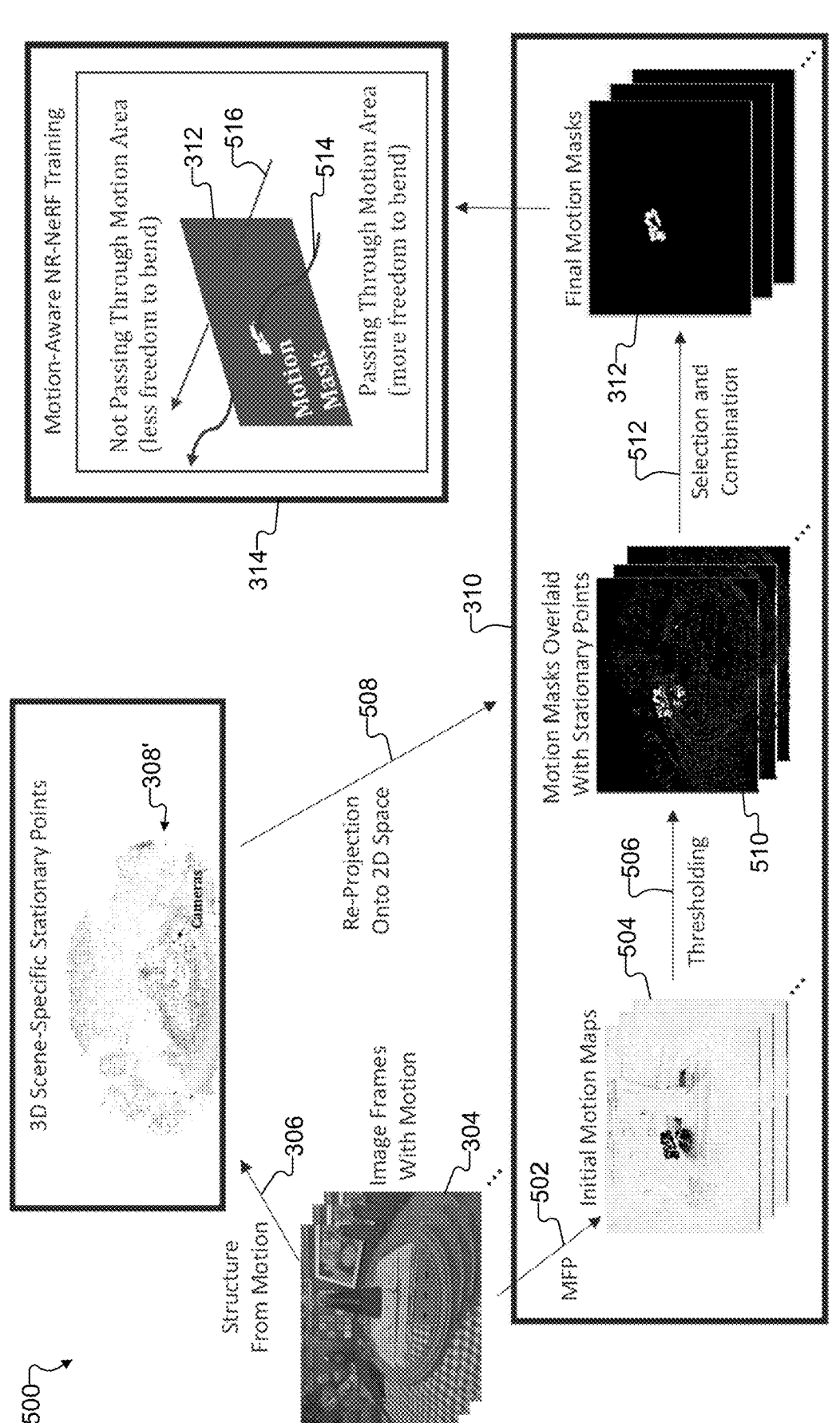
FIG. 5 illustrates an example process for motion-aware NR-NeRF network training according to this disclosure.

FIG. 5 illustrates an example process 500 for motion-aware NR-NeRF network training according to this disclosure. For ease of explanation, the process 500 is described as being used by the server 106 in the network configuration 100 of FIG. 1 to train the NR-NeRF network 200 of FIG. 2 based on the architecture 300 of FIG. 3. However, the process 500 could be used by any other suitable device(s)

with any other suitable architecture(s) and in any other suitable system(s), and the process 500 may be used to train any other suitable machine learning model(s).

As shown in FIG. 5, the training image frames 304 are processed using the structure from motion determination function 306. The outputs 308 generated by the motion determination function 306 include a point cloud 308' of sparse 3D points that identify stationary points within the specific scene captured by the training image frames 304. Note that the positions of the cameras or other imaging sensors within the point cloud 308' are also shown here. The training image frames 304 are also processed using a multi-frame processing function 502, which as noted above may be performed by the motion mask generation function 310. The multi-frame processing function 502 can produce (among other things) initial motion maps 504 associated with at least some of the training image frames 304. For example, in some cases, the multi-frame processing function 502 may, for a collection of training image frames 304 being processed, select a reference frame (with all other training image frames 304 being non-reference frames) and generate an initial motion map 504 for each non-reference frame. Each initial motion map 504 may identify differences between the reference frame and the corresponding non-reference frame, where those differences may be attributable to motion. A thresholding function 506 applies at least one threshold to the values of each initial motion map 504 in order to reduce or remove false indications of motion from the initial motion maps 504, thereby generating initial motion masks.

A projection function 508 is performed to project the point cloud 308' (which identifies the stationary points within the specific scene captured by the training image frames 304) onto each of the initial motion masks. Essentially, the stationary points within the point cloud 308' are overlaid onto the initial motion masks. This can be accomplished, for example, using transformations that map the 3D space of the point cloud 308' onto the 2D spaces of the initial motion masks. This results in the generation of projection motion masks 510, which include both (i) the areas of motion and non-motion as identified by the multi-frame processing function 502 and (ii) the stationary points of the scene as identified in the point cloud 308' overlaid onto the areas of motion and non-motion. As described below, the stationary points within the point cloud 308' may be projected onto multiple versions of each initial motion mask, so the projection function 508 may result in the generation of multiple projection motion masks 510 corresponding to each training image frame 304 or each of a subset of the training image frames 304.

A selection and combination function 512 generally operates to select a subset of the projection motion masks 510 for each of multiple training image frames 304 and to combine the selected projection motion masks 510 in order to generate a final motion mask 312 for that training image frame 304. For example, when a training image frame 304 is associated with multiple projection motion masks 510, the selection and combination function 512 may select two or more of the projection motion masks 510 having the least amount of identified motion overlapped with the projected stationary points. Since the projected stationary points are by definition stationary and not moving within the scene, it is not expected for large amounts of motion to be present in locations where there are more projected stationary points. Thus, the selection and combination function 512 can identify the projection motion masks 510 having the smallest amount(s) of overlap between the projected stationary points and the identified motion areas. The selection and combination function 512 can combine those projection motion masks 510 with one another in order to produce the final motion mask 312 for that training image frame 304.

The final motion masks 312 generated by the motion mask generation function 310 are provided to the motion-aware NR-NeRF training function 314, which uses the final motion masks 312 during motion-aware training of the NR-NeRF network 200. For example, as can be seen in FIG. 5, each motion mask 312 can be used to limit bending of rays so that (i) rays 514 passing through motion regions as defined by the motion mask 312 have more flexibility to bend and (ii) rays 516 passing through non-motion regions as defined by the motion mask 312 have less or no flexibility to bend.

Although FIG. 5 illustrates one example of a process 500 for motion-aware NR-NeRF network training, various changes may be made to FIG. 5. For example, various components or functions shown in FIG. 5 may be combined, further subdivided, rearranged, replicated, or omitted and additional components can be added according to particular needs.

Figure 6:
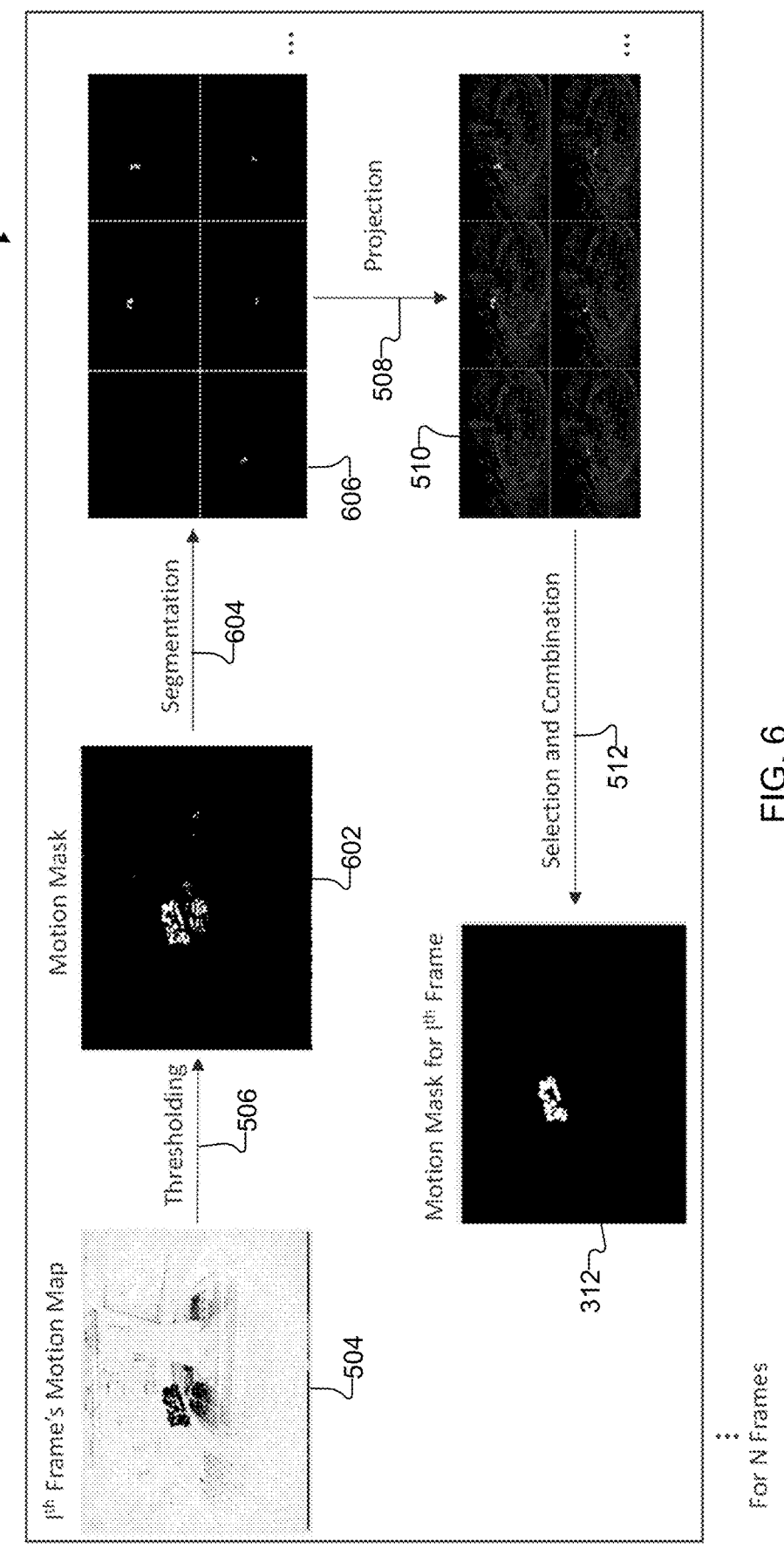
FIG. 6 illustrates an example motion mask generation function in the architecture of FIG. 3 according to this disclosure.

FIG. 6 illustrates an example motion mask generation function 310 in the architecture 300 of FIG. 3 according to this disclosure. In FIG. 6, generation of the final motion masks 312 by the motion mask generation function 310 of FIG. 5 is shown in greater detail. As shown in FIG. 6, for each of N initial motion maps 504 produced for N training image frames 304, the motion mask generation function 310 applies the thresholding function 506 in order to generate an initial motion mask 602 for the training image frame 304. The initial motion mask 602 identifies any motion areas in the initial motion map 504 that exceed at least one threshold.

The initial motion mask 602 undergoes a segmentation function 604 to generate one or more sectionalized masks 606. Each sectionalized mask 606 includes a different collection of connected pixels from the initial motion mask 602 identifying motion. For example, if each initial motion mask 602 includes black pixels identifying no motion and white pixels identifying motion, each sectionalized mask 606 can include a single collection of connected white pixels (meaning all white pixels in each sectionalized mask 606 form a single blob or "segment"). Also, different sectionalized masks 606 include different segments of pixels. Because of this, the number of sectionalized masks 606 generated here can vary based on the locations of any motion identified by the initial motion mask 602. Note that the segmentation function 604 may not be needed or may produce no sectionalized masks 606 or one sectionalized mask 606 if the initial motion mask 602 identifies no motion or includes a single segment of pixels identifying motion.

The projection function 508 projects the stationary points of the scene as defined by the point cloud 308' onto each of the sectionalized masks 606. This results in the generation of one or more projection motion masks 510, where each projection motion mask 510 corresponds to one of the sectionalized masks 606. The selection and combination function 512 can select two or more of the projection motion masks 510 and combine the selected projection motion masks 510 with one another to produce the final motion mask 312 for the corresponding training image frame 304. For instance, the selected projection motion masks 510 may include the projection motion masks 510 having the smallest amount(s) of overlap between identified motion areas and projected stationary points from the scene. As can be seen in FIG. 6, the final motion mask 312 generated by the selection and combination function 512 is cleaner and more distinctly identifies areas where the corresponding training image frame 304 likely contains motion. As noted above, this can be done for each of N training image frames 304. The resulting collection of final motion masks 312 can be used (along with the associated training image frames 304) to support motion-aware training of the NR-NeRF network 200 or other machine learning model.

Although FIG. 6 illustrates one example of a motion mask generation function 310 in the architecture 300 of FIG. 3, various changes may be made to FIG. 6. For example, various components or functions shown in FIG. 6 may be combined, further subdivided, rearranged, replicated, or omitted and additional components can be added according to particular needs.

It should be noted that the functions shown in or described with respect to FIGS. 2 through 6 can be implemented in an electronic device 101, 102, 104, server 106, or other device(s) in any suitable manner. For example, in some embodiments, at least some of the functions shown in or described with respect to FIGS. 2 through 6 can be implemented or supported using one or more software applications or other software instructions that are executed by the processor 120 of the electronic device 101, 102, 104, server 106, or other device(s). In other embodiments, at least some of the functions shown in or described with respect to FIGS. 2 through 6 can be implemented or supported using dedicated hardware components. In general, the functions shown in or described with respect to FIGS. 2 through 6 can be performed using any suitable hardware or any suitable combination of hardware and software/firmware instructions. Also, the functions shown in or described with respect to FIGS. 2 through 6 can be performed by a single device or by multiple devices.

Figure 7A:
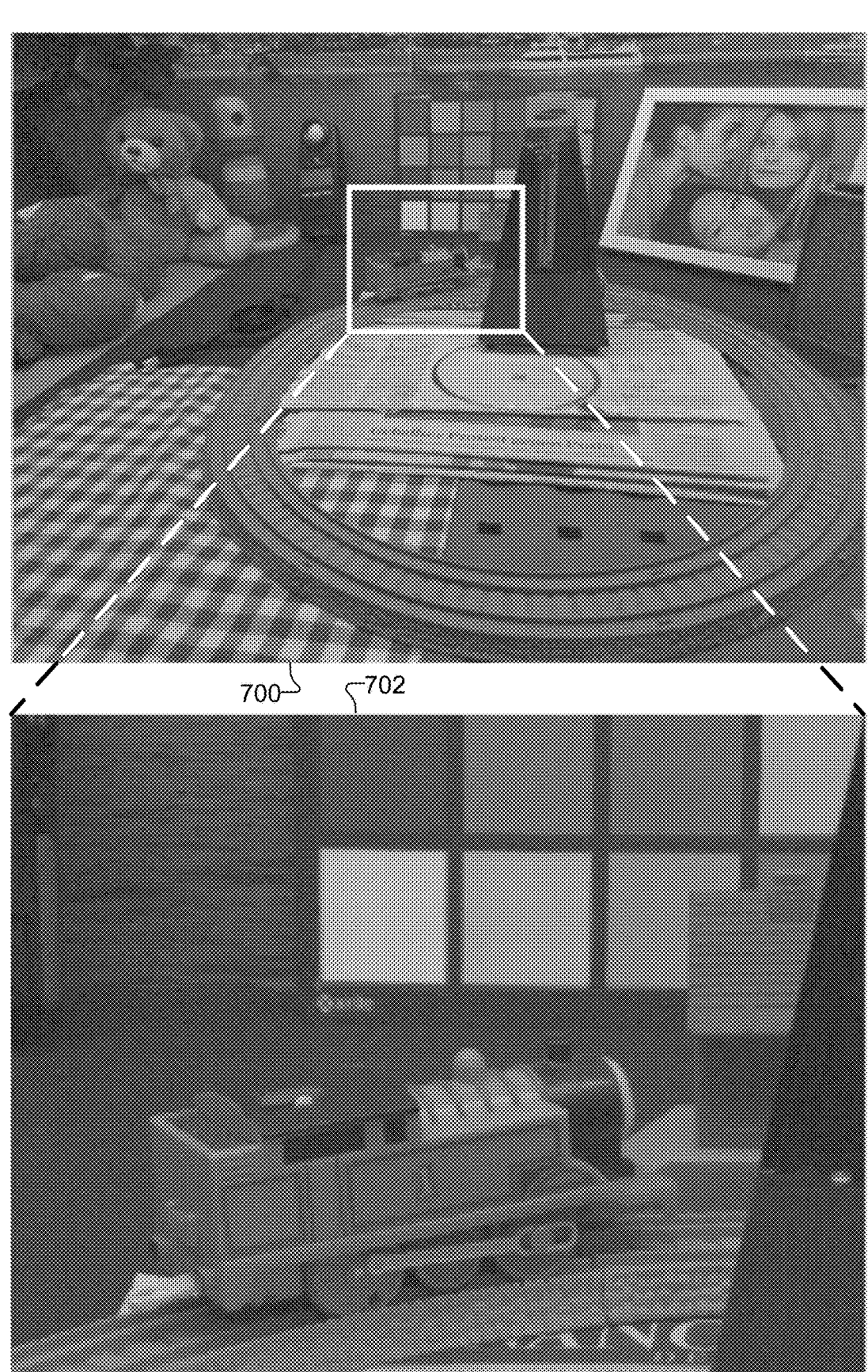
FIGS. 7A through 7C illustrate example results obtained using motion-aware NR-NeRF network training according to this disclosure.
Figure 7B:
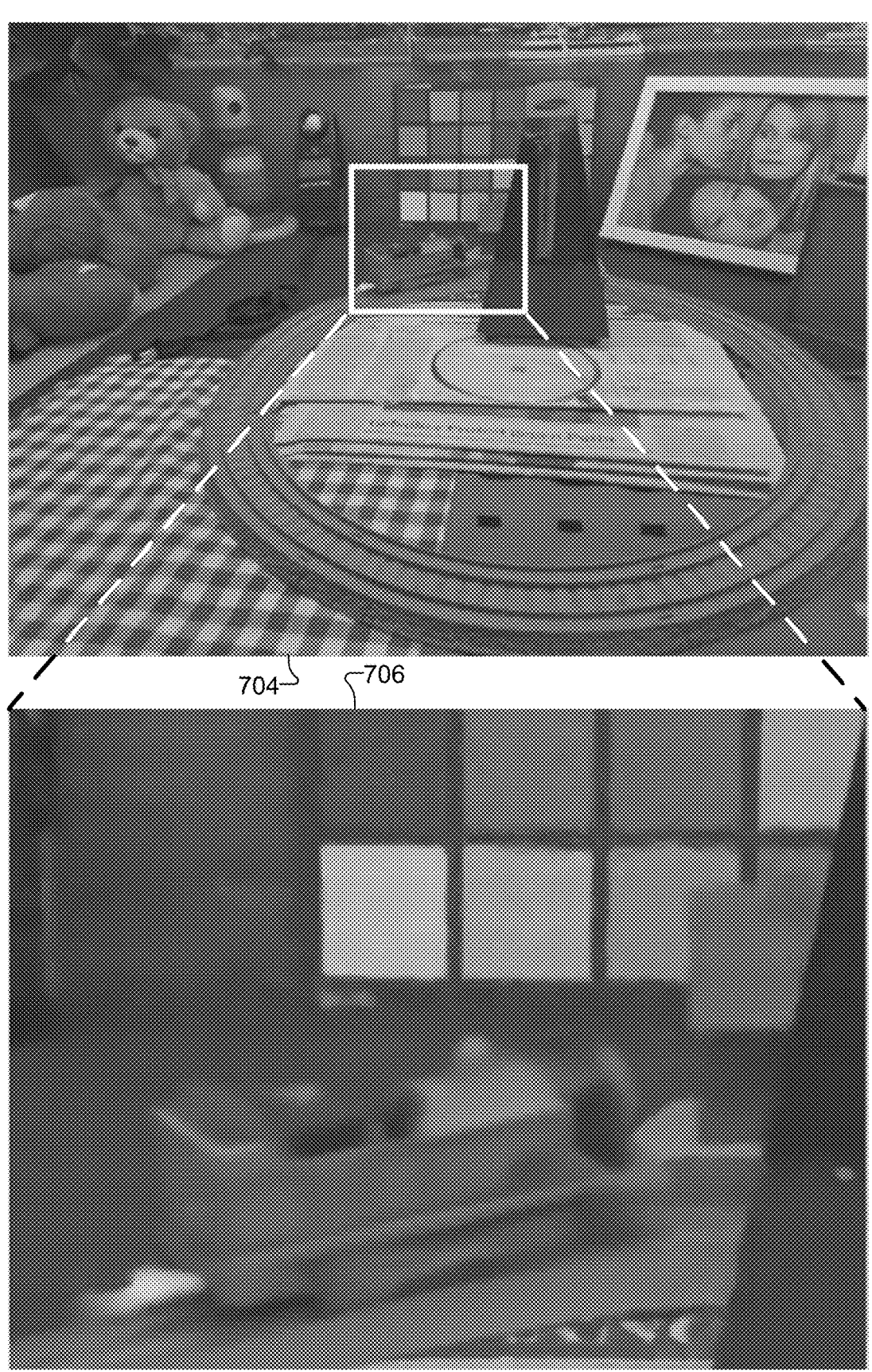
Figure 7C:
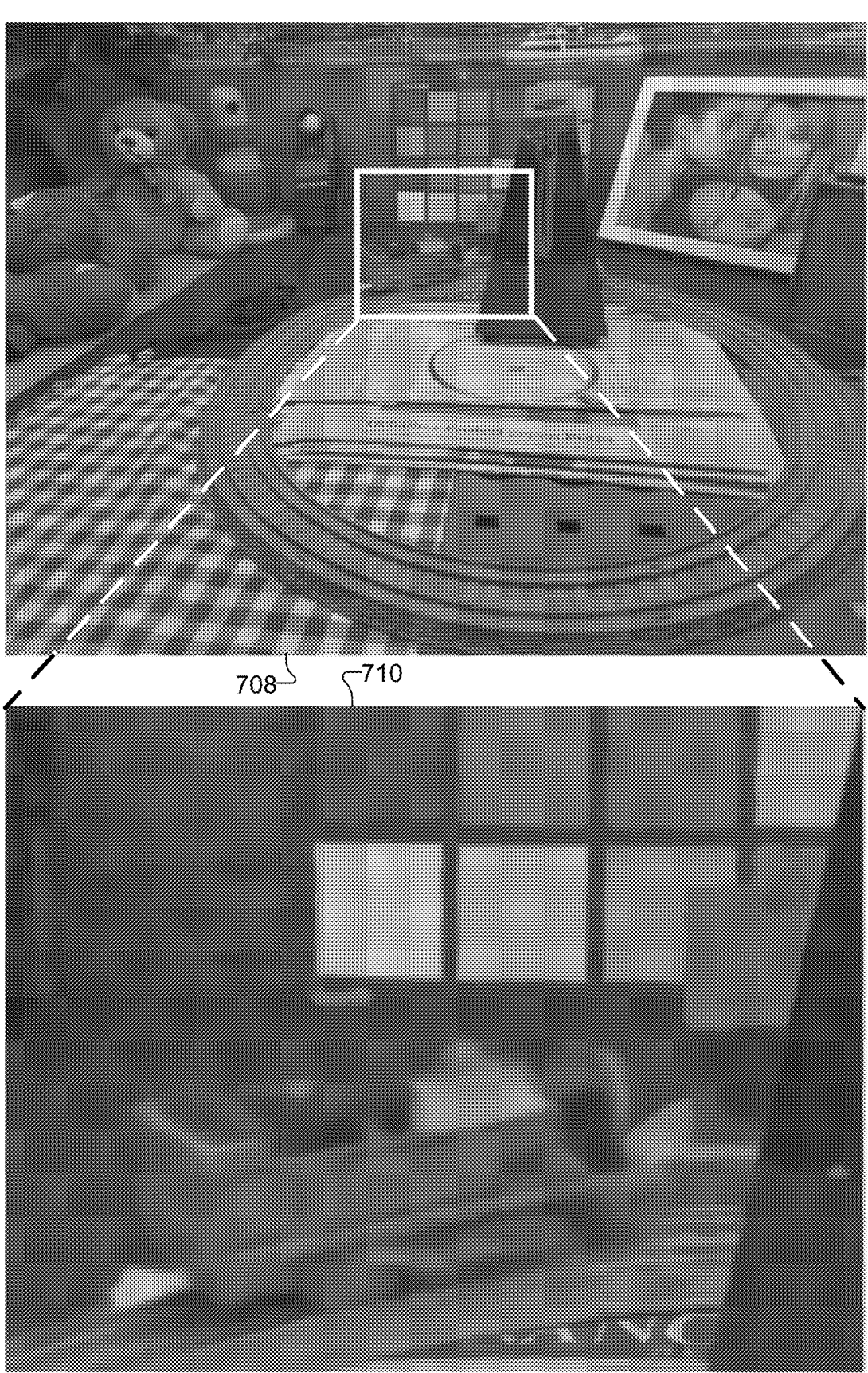

FIGS. 7A through 7C illustrate example results obtained using motion-aware NR-NeRF network training according to this disclosure. In this example, FIG. 7A illustrates a ground truth image 700 and a blown-up portion 702 of the ground truth image 700. The ground truth image 700 captures a scene in which a toy train is moving along a track in front of and around various objects, including square or rectangular tiles behind the toy train.

FIG. 7B illustrates a generated image 704 and a blown-up portion 706 of the generated image 704, where the image 704 is generated using a standard NR-NeRF network. As can be seen by comparing FIGS. 7A and 7B, the generated image 704 is of generally low quality. Among other things, the toy train in the generated image 704 is very blurry, and an artifact has been created at the back portion of the toy train where a clip is located. The tiles behind the toy train in the generated image 704 also include various artifacts, some of which cause several tiles to not appear square or rectangular.

FIG. 7C illustrates a generated image 708 and a blown-up portion 710 of the generated image 708, where the image 708 is generated using a NR-NeRF network 200 trained in accordance with the teachings of this disclosure. As can be seen by comparing FIGS. 7A through 7C, the generated image 708 is of higher quality than the generated image 704. Among other things, the toy train in the generated image 708 is somewhat clearer, and a smaller or no artifact is created at the back portion of the toy train where the clip is located. The tiles behind the toy train in the generated image 708 also include fewer artifacts and appear more square or rectangular than in the generated image 704.

Although FIGS. 7A through 7C illustrate one example of results obtained using motion-aware NR-NeRF network training, various changes may be made to FIGS. 7A through 7C. For example, the contents of the images that are processed and generated can vary widely depending on the circumstances, such as the scene being imaged and the device or devices used to capture the images. Also, the results obtained using a standard NR-NeRF network and a NR-NeRF network 200 trained in accordance with the teachings of this disclosure can vary widely depending on the circumstances, such as depending on how well the NR-NeRF networks are trained and the quality of their training data. The results shown in FIGS. 7A through 7C are merely meant to illustrate one example of the type of results that may be obtained using the motion-aware machine learning model training techniques described in this patent document.

Figure 8:
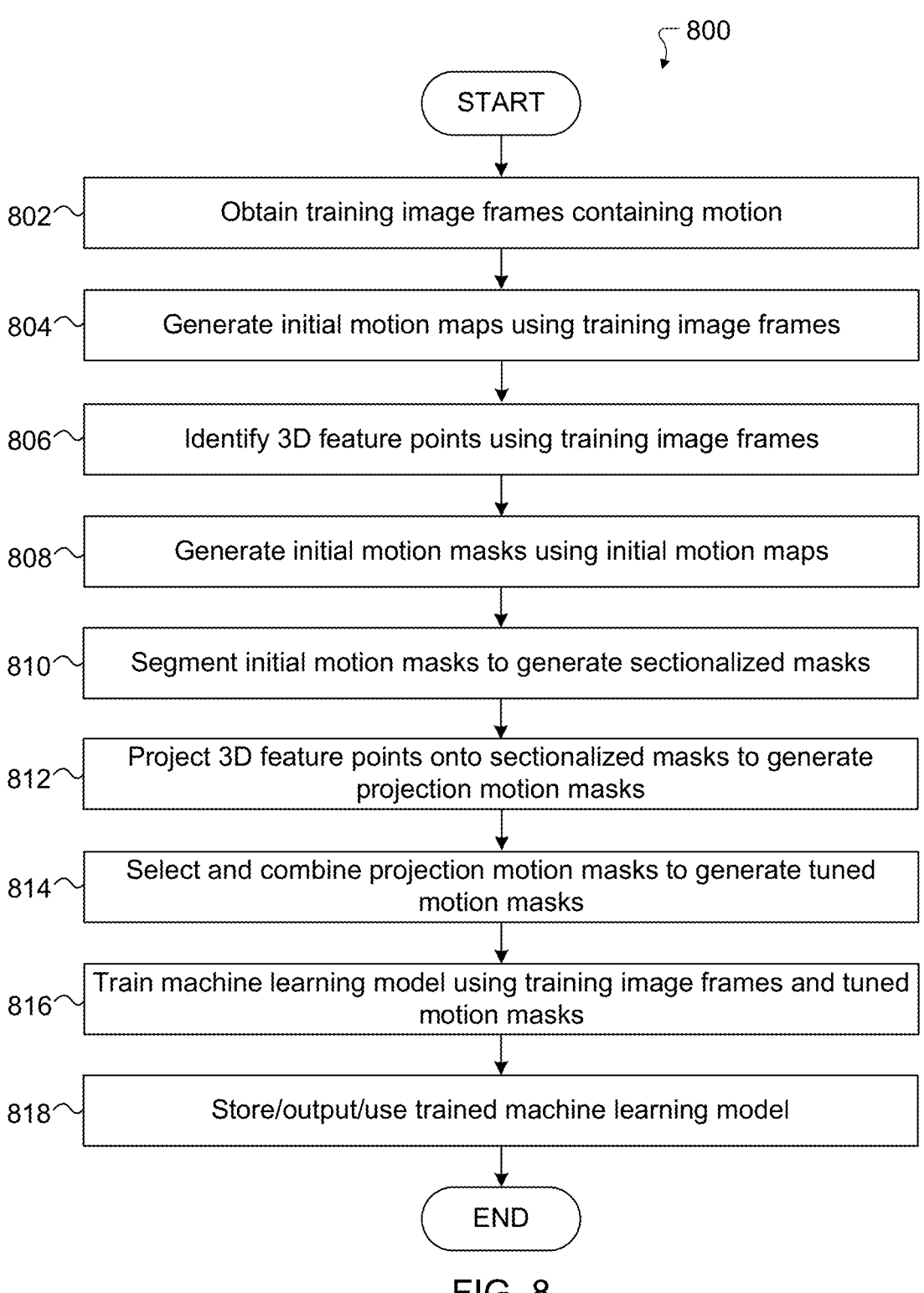
FIG. 8 illustrates an example method for motion-aware NR-NeRF network training according to this disclosure.

FIG. 8 illustrates an example method 800 for motion-aware NR-NeRF network training according to this disclosure. For ease of explanation, the method 800 is described as being performed by the server 106 in the network configuration of FIG. 1. However, the method 800 may be performed using any other suitable device(s) (such as the electronic device 101) and in any other suitable system(s).

As shown in FIG. 8, multiple training image frames of a scene are obtained at step 802. This may include, for example, the processor 120 of the server 106 obtaining training image frames 304 from an imaging sensor array 302 or other source(s) of image frames of the scene. The training image frames 304 can capture the scene at multiple viewpoints and multiple viewing angles relative to the scene, and at least some of the training image frames 304 can capture motion within the scene. Multiple initial motion maps are generated using the training image frames at step 804. This may include, for example, the processor 120 of the server 106 performing the multi-frame processing function 502 or other function to generate initial motion maps 504. In some cases, an initial motion map 504 may be generated at least for each non-reference image frame among the training image frames 304, such as when each initial motion map 504 identifies motion in a non-reference image frame relative to a reference image frame. 3D feature points associated with the scene are identified using the training image frames at step 806. This may include, for example, the processor 120 of the server 106 performing the structure from motion determination function 306 to generate a point cloud 308' identifying (among other things) stationary points within the scene.

Initial motion masks are generated using the initial motion maps at step 808. This may include, for example, the processor 120 of the server 106 performing the thresholding function 506 in order to apply at least one threshold to the initial motion maps 504 and generate initial motion masks 602. Each of the initial motion masks is segmented to generate one or more sectionalized masks at step 810. This may include, for example, the processor 120 of the server 106 performing the segmentation function 604 to generate sectionalized masks 606, each of which may include a single continuous segment of the pixels identifying motion in the associated initial motion map 504.

The 3D feature points are projected onto the sectionalized masks to produce projection motion masks at step 812. This may include, for example, the processor 120 of the server 106 performing the projection function 508 in order to project the stationary points in the point cloud 308' onto the sectionalized masks 606 and generate projection motion masks 510. Certain projection motion masks are selected and combined to generate tuned motion masks at step 814. This may include, for example, the processor 120 of the server 106 performing the selection and combination function 512 to select the projection motion masks 510 having the smallest amount(s) of overlap between identified motion and the projected stationary points in order to generate final or tuned motion masks 312. A machine learning model is trained using the training image frames and the tuned motion masks at step 816. This may include, for example, the processor 120 of the server 106 performing the motion-aware NR-NeRF training function 314 to train the NR-NeRF network 200. The machine learning model can be trained to generate 3D information about the scene (such as color data 232 and density data 234), even from viewpoints and viewing angles not captured in the training image frames 304. Moreover, the motion masks 312 can be used to guide the training of the machine learning model by differentiating between motion areas and non-motion areas within the training image frames 304, which can (among other things) affect the amount of freedom given to the ray deformation network 202 when bending rays.

The trained machine learning model may be used in any suitable manner. For example, the trained machine learning model may be stored, output, or used at step 818. This may include, for example, the processor 120 of the server 106 storing the trained NR-NeRF network 200 and using the trained NR-NeRF network 200 during inferencing. This may also or alternatively include the server 106 deploying the trained NR-NeRF network 200 to one or more other devices (such as the electronic device 101) for inferencing. Among other things, the trained NR-NeRF network 200 can be used to generate 3D information for use by the rendering function 236 when generating images 238.

Although FIG. 8 illustrates one example of a method 800 for motion-aware NR-NeRF network training, various changes may be made to FIG. 8. For example, while shown as a series of steps, various steps in FIG. 8 may overlap, occur in parallel, occur in a different order, or occur any number of times.

Figure 9:
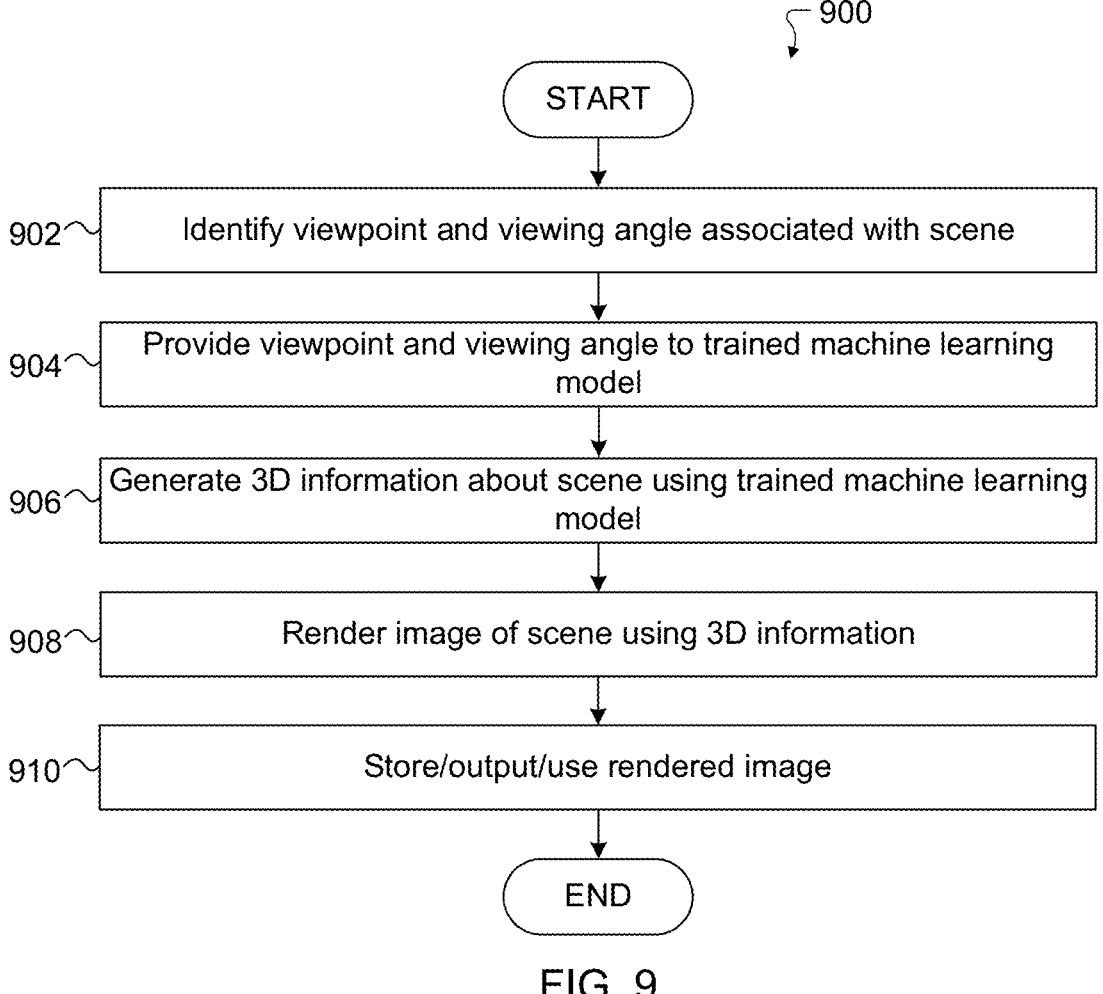
FIG. 9 illustrates an example method for using a trained NR-NeRF network according to this disclosure.

FIG. 9 illustrates an example method 900 for using a trained NR-NeRF network according to this disclosure. For ease of explanation, the method 900 is described as being performed by the electronic device 101 in the network configuration of FIG. 1. However, the method 900 may be performed using any other suitable device(s) (such as the server 106) and in any other suitable system(s).

As shown in FIG. 9, a specified viewpoint and a specified viewing angle associated with a scene are identified at step 902. This may include, for example, the processor 120 of the electronic device 101 identifying the specified viewpoint and the specified viewing angle based on user input, based on the location of the electronic device 101, or in any other suitable manner. The specified viewpoint and the specified viewing angle are provided to a machine learning model at step 904. This may include, for example, the processor 120 of the electronic device 101 providing the specified viewpoint and the specified viewing angle to a trained NR-NeRF network 200, where the NR-NeRF network 200 is trained using the motion-aware training techniques described above. As a result, the machine learning model can be trained to compensate for motion within the scene that is captured in training image frames 304 used to train the machine learning model.

3D information about the scene is generated using the machine learning model at step 906. This may include, for example, the processor 120 of the electronic device 101 generating color data 232 and density data 234 using the trained NR-NeRF network 200. An image of the scene is rendered from the specified viewpoint and at the specified viewing angle using the 3D information about the scene at step 908. This may include, for example, the processor 120 of the electronic device 101 performing the rendering function 236 in order to generate an image 238 of the scene. The specified viewpoint and the specified viewing angle can be used to define an image plane on which pixels of the image 238 are rendered. The image may be used in any suitable manner. For example, the image may be stored, output, or used at step 910. This may include, for example, the processor 120 of the electronic device 101 presenting the image 238 on the display 160 of the electronic device 101, saving the image 238 to a camera roll stored in a memory 130 of the electronic device 101, or attaching the image 238 to a text message, email, or other communication to be transmitted from the electronic device 101. Note, however, that the image 238 could be used in any other or additional manner.

Although FIG. 9 illustrates one example of a method 900 for using a trained NR-NeRF network, various changes may be made to FIG. 9. For example, while shown as a series of steps, various steps in FIG. 9 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining multiple training image frames of a scene, the training image frames captured at multiple viewpoints and multiple viewing angles relative to the scene;
   generating multiple initial motion maps using the training image frames;
   identifying three-dimensional (3D) feature points associated with the scene using the training image frames;
   generating tuned motion masks using the initial motion maps and projections of the 3D feature points onto the initial motion maps, wherein generating the tuned motion masks comprises, for each of at least some of the training image frames:
      applying at least one threshold to the initial motion map associated with the training image frame in order to generate an initial motion mask;
      segmenting the initial motion mask into segments in order to generate sectionalized masks; and
      projecting the 3D feature points onto the sectionalized masks in order to generate projection motion masks; and
   training a machine learning model using the training image frames and the tuned motion masks, the machine learning model trained to generate 3D information about the scene from viewpoints and viewing angles not captured in the training image frames.

2. The method of claim 1, wherein generating the tuned motion masks further comprises, for each of the at least some of the training image frames:
   selecting two or more of the projection motion masks; and
   combining the two or more selected projection motion masks in order to generate the tuned motion mask associated with the training image frame.

3. The method of claim 2, wherein, for each of the at least some of the training image frames, the two or more selected projection motion masks have a smallest amount or amounts of overlap between identified motion areas associated with the training image frame and the projected 3D feature points.

4. The method of claim 1, wherein the 3D feature points associated with the scene comprise stationary points within the scene as captured in the training image frames.

5. The method of claim 1, wherein the tuned motion masks guide the training of the machine learning model by differentiating between motion areas and non-motion areas within the training image frames.

6. The method of claim 1, wherein the machine learning model comprises:

a ray deformation network configured to bend rays associated with an identified perspective of the scene; and a neural radiance field network configured to generate color and density information associated with the scene based on outputs of the ray deformation network.

7. The method of claim 1, wherein, for each of the at least some of the training image frames, the at least one threshold reduces or removes false indications of motion from the initial motion map associated with the training image frame in order to generate the initial motion mask.

8. The method of claim 1, wherein, for each of the at least some of the training image frames, each of the sectionalized masks includes a different collection of connected pixels from the initial motion mask associated with the training image frame.

9. An electronic device comprising:

at least one processor configured to:

obtain multiple training image frames of a scene, the training image frames captured at multiple viewpoints and multiple viewing angles relative to the scene;

generate multiple initial motion maps using the training image frames;

identify three-dimensional (3D) feature points associated with the scene using the training image frames;

generate tuned motion masks using the initial motion maps and projections of the 3D feature points onto the initial motion maps, wherein, to generate the tuned motion masks, the at least one processor is configured, for each of at least some of the training image frames, to:

apply at least one threshold to the initial motion map associated with the training image frame in order to generate an initial motion mask;

segment the initial motion mask into segments in order to generate sectionalized masks; and project the 3D feature points onto the sectionalized masks in order to generate projection motion masks; and train a machine learning model using the training image frames and the tuned motion masks, the machine learning model trained to generate 3D information about the scene from viewpoints and viewing angles not captured in the training image frames.

10. The electronic device of claim 8, wherein, to generate the tuned motion masks, the at least one processor is further configured, for each of the at least some of the training image frames, to:

select two or more of the projection motion masks; and combine the two or more selected projection motion masks in order to generate the tuned motion mask associated with the training image frame.

11. The electronic device of claim 10, wherein, for each of the at least some of the training image frames, the two or more selected projection motion masks have a smallest amount or amounts of overlap between identified motion areas associated with the training image frame and the projected 3D feature points.

12. The electronic device of claim 9, wherein the 3D feature points associated with the scene comprise stationary points within the scene as captured in the training image frames.

13. The electronic device of claim 9, wherein the at least one processor is configured to use the tuned motion masks to guide the training of the machine learning model and differentiate between motion areas and non-motion areas within the training image frames.

14. The electronic device of claim 9, wherein the machine learning model comprises:

a ray deformation network configured to bend rays associated with an identified perspective of the scene; and a neural radiance field network configured to generate color and density information associated with the scene based on outputs of the ray deformation network.

15. A non-transitory machine readable medium containing instructions that when executed cause at least one processor to:

obtain multiple training image frames of a scene, the training image frames captured at multiple viewpoints and multiple viewing angles relative to the scene;

generate multiple initial motion maps using the training image frames;

identify three-dimensional (3D) feature points associated with the scene using the training image frames;

generate tuned motion masks using the initial motion maps and projections of the 3D feature points onto the initial motion maps, wherein the instructions that when executed cause the at least one processor to generate the tuned motion masks comprise instructions that when executed cause the at least one processor, for each of at least some of the training image frames, to:

apply at least one threshold to the initial motion map associated with the training image frame in order to generate an initial motion mask;

segment the initial motion mask into segments in order to generate sectionalized masks; and project the 3D feature points onto the sectionalized masks in order to generate projection motion masks; and train a machine learning model using the training image frames and the tuned motion masks, the machine learning model trained to generate 3D information about the scene from viewpoints and viewing angles not captured in the training image frames.

16. The non-transitory machine readable medium of claim 15, wherein the instructions that when executed cause the at least one processor to generate the tuned motion masks further comprise instructions that when executed cause the at least one processor, for each of at least some of the training image frames, to select two or more of the projection motion masks; and combine the two or more selected projection motion masks in order to generate the tuned motion mask associated with the training image frame.

17. The non-transitory machine readable medium of claim 16, wherein, for each of the at least some of the training image frames, the two or more selected projection motion masks have a smallest amount or amounts of overlap between identified motion areas associated with the training image frame and the projected 3D feature points.

18. The non-transitory machine readable medium of claim 15, wherein the 3D feature points associated with the scene comprise stationary points within the scene as captured in the training image frames.

19. The non-transitory machine readable medium of claim 15, wherein the instructions when executed cause the at least one processor to use the tuned motion masks to guide the training of the machine learning model and differentiate between motion areas and non-motion areas within the training image frames.

20. The non-transitory machine readable medium of claim 15, wherein the machine learning model comprises:

a ray deformation network configured to bend rays associated with an identified perspective of the scene; and a neural radiance field network configured to generate color and density information associated with the scene based on outputs of the ray deformation network.

\* \* \* \* \*